(12) United States Patent
Matsuzawa et al.

(10) Patent No.: US 9,174,166 B2
(45) Date of Patent: Nov. 3, 2015

(54) METHOD AND DEVICE FOR TREATING AMMONIA IN GASIFICATION SYSTEM

(75) Inventors: Yoshiaki Matsuzawa, Tokyo (JP); Hiroaki Ohara, Tokyo (JP); Koki Hamada, Tokyo (JP)

(73) Assignee: IHI Corporation, Tokyo (JP)

( * ) Notice: Subject to any disclaimer, the term of this patent is extended or adjusted under 35 U.S.C. 154(b) by 634 days.

(21) Appl. No.: 13/505,583

(22) PCT Filed: Oct. 21, 2010

(86) PCT No.: PCT/JP2010/006236
§ 371 (c)(1),
(2), (4) Date: May 2, 2012

(87) PCT Pub. No.: WO2011/055500
PCT Pub. Date: May 12, 2011

(65) Prior Publication Data
US 2012/0219486 A1   Aug. 30, 2012

(30) Foreign Application Priority Data

Nov. 9, 2009   (JP) .................................. 2009-255964

(51) Int. Cl.
| | |
|---|---|
| *C10J 3/54* | (2006.01) |
| *B01D 53/56* | (2006.01) |
| *C10J 3/48* | (2006.01) |
| *B01D 53/58* | (2006.01) |
| *F23G 5/027* | (2006.01) |
| *C10K 3/06* | (2006.01) |

(52) U.S. Cl.
CPC ............... *B01D 53/56* (2013.01); *B01D 53/58* (2013.01); *C10J 3/482* (2013.01); *C10J 3/54* (2013.01); *C10K 3/06* (2013.01); *F23G 5/027* (2013.01); *B01D 2251/2062* (2013.01); *B01D 2258/0283* (2013.01); *C10J 2300/094* (2013.01); *C10J 2300/0956* (2013.01); *F23G 2201/304* (2013.01); *F23G 2201/40* (2013.01)

(58) Field of Classification Search
None
See application file for complete search history.

(56) References Cited

U.S. PATENT DOCUMENTS

| | | | | |
|---|---|---|---|---|
| 4,756,890 A | * | 7/1988 | Tang et al. .................... | 423/235 |
| 5,069,886 A | * | 12/1991 | Frey et al. ..................... | 423/237 |
| 5,407,649 A | * | 4/1995 | Andersson et al. .............. | 431/7 |
| 5,419,286 A | * | 5/1995 | Edison et al. ................. | 123/1 A |
| 5,553,557 A | * | 9/1996 | Abdulally ..................... | 110/345 |
| 8,506,917 B2 | * | 8/2013 | Ohara et al. .................. | 423/237 |
| 2003/0130360 A1 | * | 7/2003 | Kindig et al. ................. | 518/703 |
| 2003/0205184 A1 | * | 11/2003 | Ramme et al. ................ | 110/345 |
| 2004/0159096 A1 | * | 8/2004 | Yasui et al. ..................... | 60/286 |
| 2007/0202031 A1 | * | 8/2007 | Breuer et al. ................. | 423/352 |
| 2009/0060806 A1 | * | 3/2009 | Maryamchik ................ | 422/311 |

FOREIGN PATENT DOCUMENTS

| | | | |
|---|---|---|---|
| EP | 0569183 | * | 4/1993 |
| JP | 401075586 | * | 3/1989 |
| JP | 11-57397 | | 3/1999 |
| JP | 2000-290668 | | 10/2000 |
| JP | 2003-3177 | | 1/2003 |
| JP | 2005-41959 | | 2/2005 |
| JP | 2007-63539 | | 3/2007 |
| JP | 2007-252975 | | 10/2007 |

OTHER PUBLICATIONS

International Search Report issued Nov. 16, 2010 in PCT/JP2010/006236.

* cited by examiner

*Primary Examiner* — Melvin C Mayes
*Assistant Examiner* — Sheng H Davis
(74) *Attorney, Agent, or Firm* — Oblon, McClelland, Maier & Neustadt, L.L.P.

(57) ABSTRACT

Ammonia off-gas, which is separated and recovered by an ammonia recovery device from gasification gas produced in a gasification furnace in a two-column gasification system, is injected as reducing agent for denitration into an inlet of a cyclone for separation of bed material heated in a combustion furnace from combustion exhaust gas and for returning the bed material to the gasification furnace. The ammonia off-gas is contacted with the high-temperatured combustion exhaust gas to reduce and remove $NO_x$ through non-catalytic decomposition. Any excess of the ammonia off-gas is distributed for burning to primary air to the combustion furnace.

3 Claims, 2 Drawing Sheets

METHOD AND DEVICE FOR TREATING AMMONIA IN GASIFICATION SYSTEM

TECHNICAL FIELD

The present invention relates to a method and a device for treating ammonia in a gasification system.

BACKGROUND ART

It is recently proposed in view of probable petroleum depletion to conduct gasification using, as raw material, petroleum coke as residue in petroleum refinery and/or any resource currently not efficiently utilized such as oilsand, bitumen, brown or other low-quality coal or other fossil fuel, biomass and tire chips to produce and efficiently utilize gasification gas comprising hydrogen, hydrocarbon and the like.

FIG. 1 schematically shows an example of a gasification system for production of gasification gas. Illustrated is a two-column gasification system with gasification and combustion furnaces 1 and 2, the gasification furnace 1 being fed with water vapor 3 from below to form a fluidized bed of bed material 4 (such as silica sand or limestone) for gasification of raw material (such as coal, biomass or plastic waste) charged to the fluidized bed, resultant gasification gas 6 being fed to a succeeding gas refining system (not shown).

The bed material 4 in the gasification furnace 1 is guided, together with unreacted char 7 produced in the furnace 1, through a duct 1a on the furnace 1 to a combustion furnace 2 in an overflow manner, is blown up by primary air 8 fed to the furnace 2 from below and is heated by burning of the char 7.

Combustion exhaust gas 9 blown up in the combustion furnace 2 together with the bed material 4 is then guided through a top of the furnace 2 to a cyclone 10 where the bed material 4 is separated. The separated bed material 4 is returned through a downcomer 11 to the gasification furnace 1 while the combustion exhaust gas 9 discharged through a top of the cyclone 10 is fed for treatment to a succeeding exhaust gas treatment system (not shown).

Specifically, the combustion exhaust gas 9 resulting from the char 7 burned in the combustion furnace 2, which contains nitrogen oxides ($NO_x$) of the order of several hundred ppm (several g/kg-fuel), requires to be denitrated. To this end, conventionally the combustion exhaust gas 9 discharged through the top of the cyclone 10 is guided, after heat recovered therefrom, to a catalytic $NO_x$ removal device (not shown) with $NO_x$ removal catalyst where ammonia, urea or the like is used as reducing agent to reduce the nitrogen oxides ($NO_x$) in the combustion exhaust gas 9 to harmless nitrogen ($N_2$) and water vapor ($H_2O$).

On the other hand, the gasification gas 6 produced in and discharged from the gasification furnace 1, which contains high levels of ammonia, passes thorough a tar reforming furnace 12 or the like and is fed to an ammonia recovery device 13 where the ammonia in the gasification gas 6 is separated and recovered.

Specifically, it has been known that several percent by weight or more of nitrogen is contained in coal fed as raw material 5 to the gasification furnace 1, even more nitrogen being contained in the case of biomass. As a result, in the gasification furnace 1 of the two-column gasification system shown in FIG. 1 where the water vapor 3 is used as gasifying agent, the gasification of the nitrogen-containing raw material 5 as mentioned in the above brings about the gasification gas 6 having high levels of ammonia.

The ammonia recovery device 13 comprises an ammonia absorber 14 which absorbs and removes ammonia through contact of the gasification gas 6 with an absorptive liquid such as water and an ammonia diffuser 16 which diffuses the ammonia as ammonia off-gas 17 through heating of the ammonia-absorbing absorptive liquid by feed of water vapor 15. The ammonia off-gas 17, which has high levels of ammonia and problematically ammonical, is guided to a treatment device (not shown) for reduction and release to atmosphere through catalytic decomposition into harmless nitrogen ($N_2$) and water vapor ($H_2O$).

Prior art literatures on gasification systems pertinent to the invention are, for example, Patent Literatures 1 and 2.

CITATION LIST

Patent Literature

[Patent Literature 1] JP2005-041959A
[Patent Literature 2] JP2000-290668A

SUMMARY OF INVENTION

Technical Problems

However, as mentioned in the above, in the two-column gasification system with the gasification and combustion furnaces, the ammonia off-gas from the ammonia diffuser requires to be guided to the large-scale treatment device for reduction through the catalytic decomposition into harmless nitrogen ($N_2$) and water vapor ($H_2O$), disadvantageously resulting in increase of construction cost required for the treatment device.

Patent Literature 2 discloses that ammonia recovered from a cleaning liquid is injected distributively to a gas inlet and a gas outlet of a regeneration gas (off-gas) combustion furnace and that the exhaust gas with the ammonia injected thereinto at the gas outlet of the furnace is guided for denitration to a catalytic ammonia reduction type $NO_x$ removal device while being high-temperatured; according to Patent Literature 2, the ammonia recovered from the cleaning liquid can be effectively utilized for denitration. However, in Patent Literature 2, the large-sized catalytic ammonia reduction type $NO_x$ removal device is required for denitration of the regeneration gas mixed with the ammonia, so that disadvantageously the equipment becomes large-sized and costly. Moreover, the regeneration gas heated in a regeneration tower is high-temperatured whereas the ammonia recovered from the cleaning liquid is low-temperatured; mixing of such different temperatured regeneration gas and ammonia brings about distinct two layers hardly homogeneously mixable, failing in having effectively enhanced desulfurization ability in the catalytic ammonia reduction type $NO_x$ removal device.

The invention was made in view of the above and has its object to use ammonia recovered from gasification gas produced in a gasification furnace to effectively reduce and remove $NO_x$ in combustion exhaust gas in a simple construction.

Solution to Problems

The invention is directed to a method for treating ammonia in a gasification system having a gasification furnace for gasifying raw material into gasification gas through formation of a fluidized bed of bed material by introduction of a gasifying agent, a combustion furnace for blowing up by a primary air the bed material guided from said gasification furnace together with unreacted char to heat the bed material by burning of said char, a cyclone for separating the bed material heated in said combustion furnace from combustion exhaust gas to return the bed material to said gasification furnace and an ammonia recovery device for separating and recovering ammonia from the gasification gas produced in said gasification furnace, the method comprising injecting the ammonia recovered in said ammonia recovery device, as reducing agent for denitration, into an inlet of said cyclone to contact the ammonia with the high-temperatured combustion exhaust gas to thereby reduce and remove $NO_x$ through non-catalytic decomposition, and distributing any excess of the ammonia to said primary air to the combustion furnace to thereby burn the excess.

In the method for treating ammonia in the gasification system, it is preferable that a concentration of the ammonia is measured downstream of the cyclone, the excess of the ammonia being distributed to the primary air to the combustion furnace in such a manner that a measured concentration is of a predetermined value.

The invention is also directed to a device for treating ammonia in a gasification system having a gasification furnace for gasifying raw material into gasification gas through formation of a fluidized bed of bed material by introduction of a gasifying agent, a combustion furnace for blowing up by a primary air the bed material guided from said gasification furnace together with unreacted char to heat the bed material by burning of said char, a cyclone for separating the bed material heated in said combustion furnace from combustion exhaust gas to return the bed material to said gasification furnace and an ammonia recovery device for separating and recovering ammonia from the gasification gas produced in said gasification furnace, the device comprising a first line for injection of the ammonia recovered in said ammonia recovery device as reducing agent for denitration into an inlet of said cyclone, a second line branched halfway from said first line for injection of the ammonia into said primary air to the combustion furnace and a distributor arranged at a branch point of the first and second lines for adjusting a distribution ratio of the ammonia.

In the device for treating ammonia in the gasification system, it is preferable that the device further comprises a gauge for measuring a concentration of the ammonia downstream of the cyclone and a controller having a detection signal inputted from said gauge for controlling the distribution ratio of the distributor in such a manner that the measured concentration of the ammonia is of a predetermined value.

Advantageous Effects of Invention

A method and a device for treating ammonia in a gasification system according to the invention have excellent effects. The ammonia separated and recovered from the gasification gas can be utilized as reducing agent for denitration of the combustion exhaust gas, so that the ammonia can be economically treated in the gasification system without using a large-sized ammonia treatment device. Moreover, concurrently with the ammonia treatment, substantial reduction of $NO_x$ in the combustion exhaust gas can be attained to substantially reduce a cost required for reduction and removal of $NO_x$. Further, even if any excess of ammonia is produced, the excess can be distributed for burning to the primary air to the combustion furnace, so that the combustion exhaust gas is prevented from having much residual ammonia.

Furthermore, the ammonia recovered from the gasification gas produced in the gasification furnace is injected as reducing agent for denitration into the combustion gas at the inlet of the cyclone, so that the combustion exhaust gas and the ammonia are homogeneously mixed together through high-speed revolution of the cyclone, which enables effective reduction and removal of $NO_x$ in the combustion exhaust gas through simply constructed non-catalytic decomposition.

DESCRIPTION OF EMBODIMENT

Figure 1:
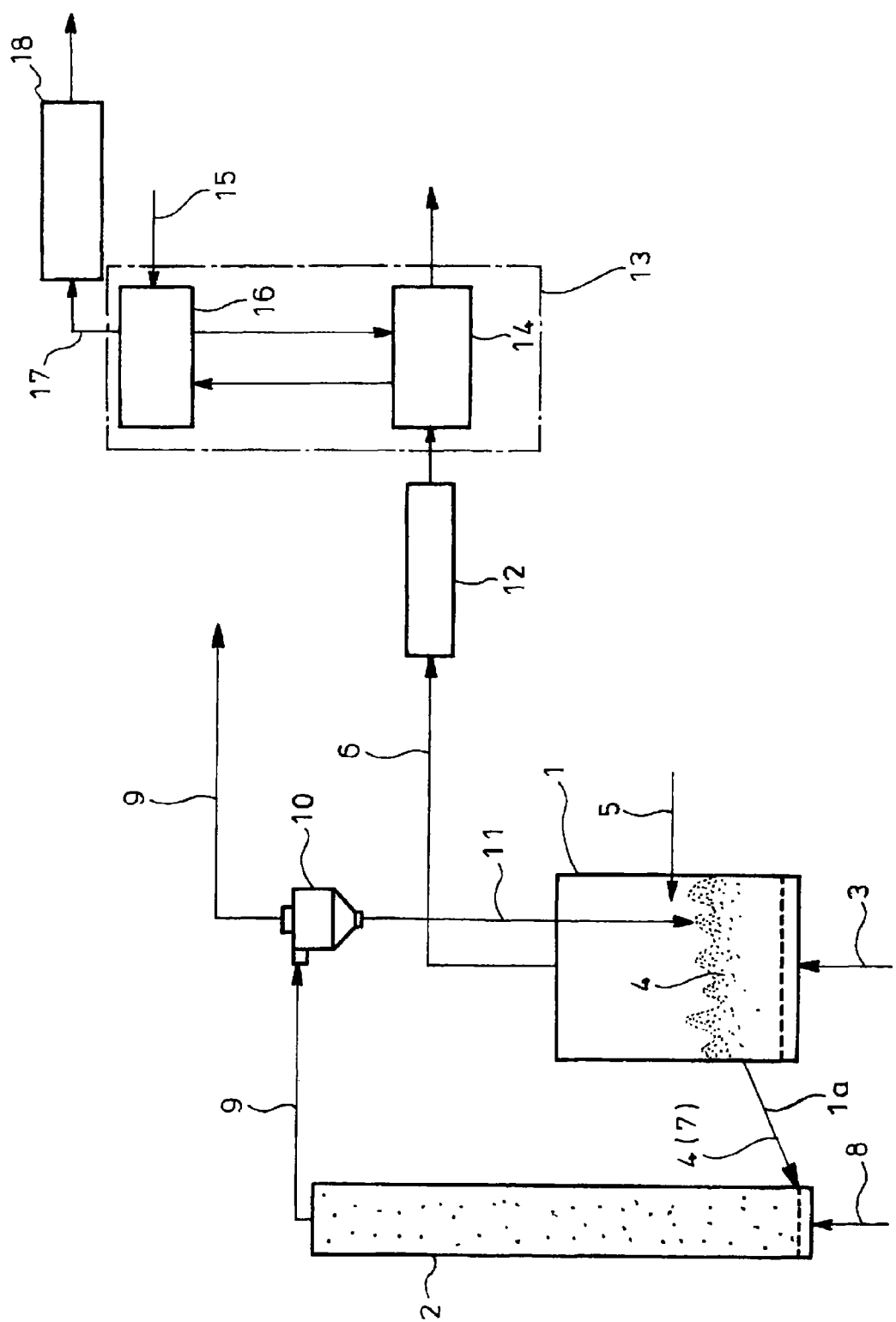
FIG. 1 is a block diagram schematically showing an example of a conventional two-column gasification system.

An embodiment of the invention will be described in conjunction with the drawing.

Figure 2:
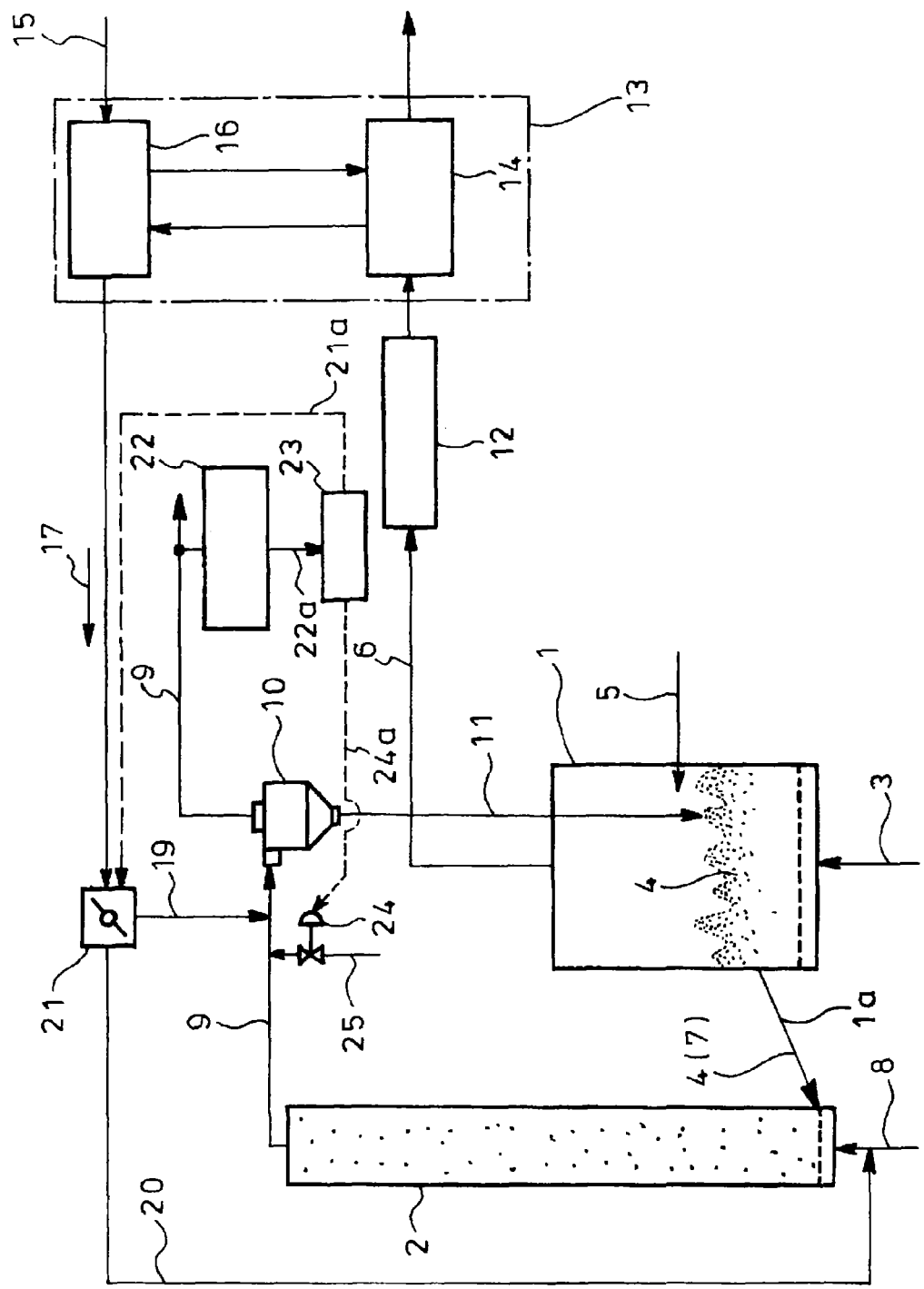
FIG. 2 is a block diagram showing an embodiment of the invention applied to the two-column gasification system shown in FIG. 1.

FIG. 2 is a block diagram showing the embodiment of the invention in which parts similar to those in FIG. 1 are represented by the same reference numerals. Though a basic construction is as illustrated in the block diagram in FIG. 2, the embodiment of the invention is distinctive, as shown in FIG. 2, in that it comprises a first line 19 for injection of the ammonia off-gas 17 (ammonia recovered in the ammonia recovery device 13) diffused from the absorptive liquid (water) in the ammonia diffuser 16, as reducing agent for denitration, into an inlet of the cyclone 10, a second line 20 branched halfway from the first line 19 for injection of the ammonia off-gas 17 into the primary air 8 to the combustion furnace 2 and a distributor 21 arranged at a branch point of the first and second lines 20 to adjust a distribution ratio of the ammonia off-gas 17.

Thus, eliminated in the FIG. 2 construction are the conventional treatment device which reduces the ammonia off-gas 17 recovered and guided from the ammonia diffuser 16 through catalytic decomposition into harmless nitrogen ($N_2$) and water vapor ($H_2O$) and the conventional catalytic $NO_x$ removal device which reduces the nitrogen oxides in the combustion exhaust gas 9 through the top of the cyclone 10 by way of catalytic decomposition into harmless nitrogen ($N_2$) and water vapor ($H_2O$).

Specifically, in the FIG. 2 embodiment, the ammonia off-gas 17 from the ammonia diffuser 16 is injected as reducing agent for denitration through the first line 19 into the inlet of the cyclone 10, so that the high-temperatured combustion exhaust gas 9 of the order of 900-1000° C. is contacted with the ammonia off-gas 17 to reduce and remove $NO_x$ through non-catalytic decomposition. Any excess of the ammonia off-gas 17 is distributed by the distributor 21 through the second line 20 to the primary air 8 to the combustion furnace 2 and is burned.

To this end, arranged in the above embodiment are a gauge 22 which measures a concentration of the ammonia in the combustion exhaust gas 9 downstream of the cyclone 10 and a controller 23 which has a detection signal 22a inputted from the gauge 22 to control the distribution ratio of the distributor 21 in such a manner that a measured concentration of the ammonia is of a predetermined value, any excess of the ammonia off-gas 17 to be fed to the inlet of the cyclone 10 being distributed by the distributor 21 to the primary air 8 to the combustion furnace 2.

Thus, at the inlet of the cyclone 10, the ammonia off-gas 17 from the ammonia diffuser 16 is injected through the first line 19 into the combustion exhaust gas 9 from the combustion furnace 2, so that the ammonia off-gas 17 and combustion exhaust gas 9 are properly homogeneously mixed together through high-speed revolution during passing through the cyclone 10, whereby $NO_x$ in the combustion exhaust gas 9 is effectively reduced and removed through non-catalytic decomposition. As a result, the conventional catalytic $NO_x$ removal device arranged for denitration of the nitrogen oxides in the combustion exhaust gas 9 can be eliminated. Furthermore, the consumption of the ammonia off-gas 17 as reducing agent for denitration makes it possible to eliminate the conventional treatment device for reduction and removal of the ammonia off-gas 17 discharged from the ammonia diffuser 16.

In the above, trial to use a piping or the like for mixing the high-temperatured combustion exhaust gas 9 from the combustion furnace 2 with the low-temperatured ammonia off-gas 17 from the ammonia recovery device 13 would result in layers of the different temperatured combustion exhaust gas 9 and ammonia off-gas 17 and fail in proper mixing of them; as a result, it would be hardly expected to properly reduce and remove the nitrogen oxides in the combustion exhaust gas 9 through non-catalytic decomposition. However, in the FIG. 2 embodiment, the ammonia off-gas 17 is injected into the inlet of the cyclone 10 of the two-column gasification system and mixed with the combustion exhaust gas 9, so that the proper mixing of the ammonia off-gas 17 with the combustion exhaust gas 9 is conducted through high-speed agitation effect by the cyclone 10 to thereby attain effective reduction and removal of $NO_x$ through non-catalytic decomposition.

In this case, detection by the gauge 22 of the ammonia concentration exceeding the predetermined value is regarded as excessive injection of the ammonia off-gas 17 into the inlet of the cyclone 10, so that a control signal 21a from the controller 23 changes the distribution ratio of the distributor 21 to reduce the injection of the ammonia off-gas 17 into the inlet of the cyclone 10. Any excess of the ammonia off-gas 17 is distributed by the distributor 21 through the second line 20 to the primary air 8 to the combustion furnace 2 and is burned in the combustion furnace 2.

However, the ammonia off-gas 17 fed for burning to the combustion furnace 2 partially changes into $NO_x$ during the burning since a burning zone at a bottom of the furnace is in a state of excessive oxygen. The new increase of $NO_x$ deriving from the ammonia leads to increase of $NO_x$ from the combustion furnace 2 to the cyclone 10, which accordingly brings about increase in consumption of the ammonia off-gas 17 injected through the first line 19 into the inlet of the cyclone 10; accordingly, the control is made such that the concentration of the ammonia measured by the gauge 22 is lowered to the predetermined value or below. Upon excessive lowering of the concentration of the ammonia measured by the gauge 22 relative to the predetermined value, the ammonia off-gas 17 distributed to the first line 19 is properly increased by the controller 23; in this manner, the distribution ratio of the distributor 21 is properly controlled by the controller 23 such that the measured concentration by the gauge 22 is always retained to the predetermined value.

At start-up of charging of the raw material 5 to the gasification furnace 1, the ammonia off-gas 17 cannot yet be guided from the ammonia diffuser 16 to the first line 19. Thus, for support of the reduction and removal of $NO_x$, auxiliary ammonia 25 is injected through a flow rate regulating valve 24 into the inlet to the cyclone 10 until a required amount of ammonia off-gas 17 is guided. The injection of the auxiliary ammonia 25 may be controlled through the flow rate regulating valve 24 by a control signal 24a from the controller 23; in this case, the distributor 21 may have a fixed distribution ratio of 100% to the first line 19.

Specifically, at the start-up of charging of the raw material 5 to the gasification furnace 1, the flow rate regulating valve 24 is opened by the controller 23 for injection of the auxiliary ammonia 25 such that the concentration of the ammonia measured by the gauge 22 is of the predetermined value. Then, the ammonia off-gas 17 from the ammonia diffuser 16 increases in amount with lapse of time, which makes the concentration of the ammonia measured by the gauge 22 exceed the predetermined value. Thus, the flow rate regulating valve 24 is gradually throttled so as to return the measured concentration of the ammonia to the predetermined value. In this manner, the control is made to reduce the injection of the auxiliary ammonia 25 such that the concentration of the ammonia measured by the gauge 22 is retained to the predetermined value.

Thereafter, the flow rate regulating valve 24 is closed to stop the injection of the auxiliary ammonia 25 when the concentration of the ammonia measured by the gauge 22 reaches the predetermined value owing only to the ammonia off-gas 17 from the ammonia diffuser 16; changeover is made to the control by way of the distributor 21 as mentioned in the above. That is, the distribution ratio may be controlled such that the concentration of the ammonia measured by the gauge 22 is retained to the predetermined value.

Thus, according to the above embodiment, the ammonia off-gas 17 (ammonia) separated and recovered from the gasification gas 6 can be utilized as reducing agent for denitration of the combustion exhaust gas 9, so that the ammonia off-gas 17 can be economically treated in the gasification system without using the conventionally proposed large-sized ammonia treatment device. Moreover, concurrently with the ammonia treatment, substantial reduction of $NO_x$ in the combustion exhaust gas 9 can be attained through non-catalytic decomposition using the ammonia off-gas 17. Thus, $NO_x$ and the ammonia off-gas 17 can be economically treated using the simple device.

Furthermore, the ammonia off-gas 17 recovered from the gasification gas 6 produced in the gasification furnace 1 is injected as reducing agent for denitration into the combustion gas 9 at the inlet of the cyclone 10, so that the combustion exhaust gas 9 and ammonia off-gas 17 are homogenously mixed together through high-speed revolution of the cyclone 10, whereby $NO_x$ in the combustion exhaust gas can be effectively reduced and removed through simply constructed non-catalytic decomposition.

It is to be understood that a method and a device for treating ammonia in a gasification system according to the invention are not limited to the above embodiment and that various changes and modifications may be made without departing from the scope of the invention.

REFERENCE SIGNS LIST 1 gasification furnace
2 combustion furnace
3 water vapor (gasifying agent)
4 bed material
5 raw material
6 gasification gas
7 char
8 primary air
9 combustion exhaust gas
10 cyclone
13 ammonia recovery device
17 ammonia off-gas (ammonia)
19 first line
20 second line 21 distributor
21a control signal
22 gauge
22a detection signal
23 controller

INDUSTRIAL APPLICABILITY

According to a method and a device for treating ammonia in a gasification system of the invention, ammonia recovered from gasification gas in a gasification furnace can be used to effectively reduce and remove $NO_x$ in combustion exhaust gas in a simple construction.

The invention claimed is:
1. A device for treating ammonia in a gasification system having a gasification furnace for gasifying raw material into gasification gas through formation of a fluidized bed of bed material by introduction of a gasifying agent, a combustion furnace for blowing up by a primary air the bed material guided from said gasification furnace together with unreacted char to heat the bed material by burning of said char, a cyclone for separating the bed material heated in said combustion furnace from combustion exhaust gas to return the bed material to said gasification furnace and an ammonia recovery device for separating and recovering ammonia from the gasification gas produced in said gasification furnace, the device comprising:

a first line for injection of the ammonia produced in said gasification furnace and recovered in said ammonia recovery device as reducing agent for denitration into an inlet of said cyclone;
a second line branched halfway from said first line for injection of the ammonia into said primary air to the combustion furnace to burn the ammonia; and
a distributor arranged at a branch point of the first and second lines for adjusting a distribution ratio of the ammonia.

2. The device for treating ammonia in the gasification system as claim in claim 1, further comprising:
a gauge for measuring a concentration of the ammonia downstream of the cyclone; and
a controller having a detection signal inputted from said gauge for controlling the distribution ratio of the distributor in such a manner that the measured concentration of the ammonia is of a predetermined value.

3. The device for treating ammonia in the gasification system as claim in claim 2, further comprising:
a flow rate regulating valve through which auxiliary ammonia is injected into the inlet of said cyclone,
wherein the controller controls the regulating valve such that the auxiliary ammonia is injected into the inlet of said cyclone until a predetermined amount of the ammonia is produced in said gasification furnace and recovered in said ammonia recovery device.

* * * * *